No. 620,215. Patented Feb. 28, 1899.
J. G. BLACK & R. C. SKEET.
PROCESS OF EXTRACTING GOLD FROM ORES, MINERALS, OR OTHER GOLD BEARING SUBSTANCES.
(Application filed Dec. 16, 1897.)
(No Model.)
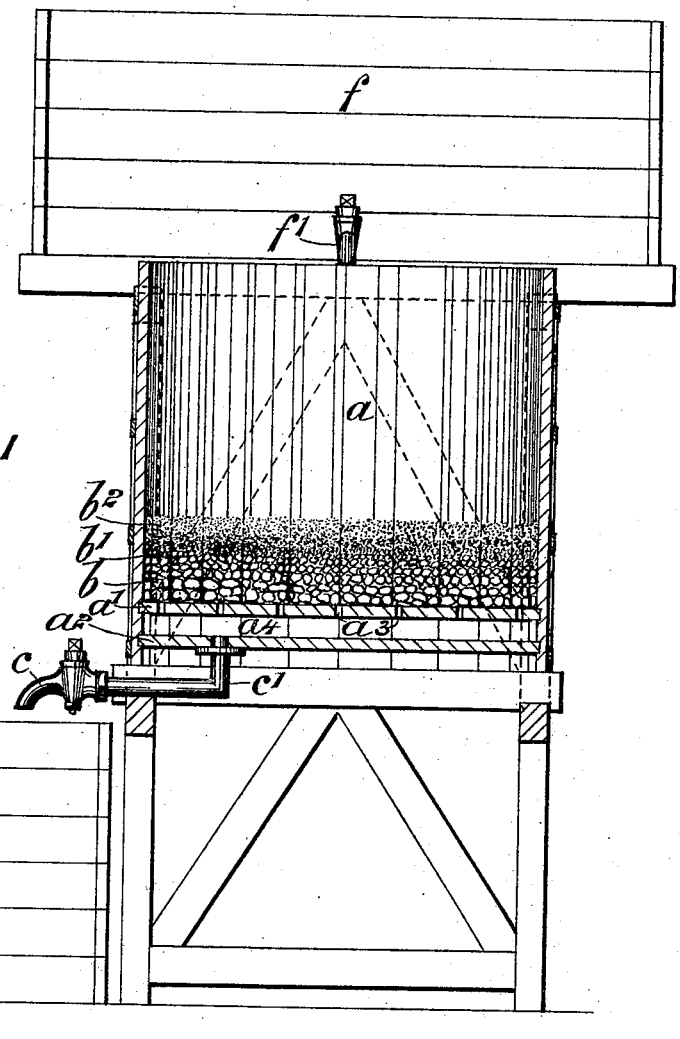
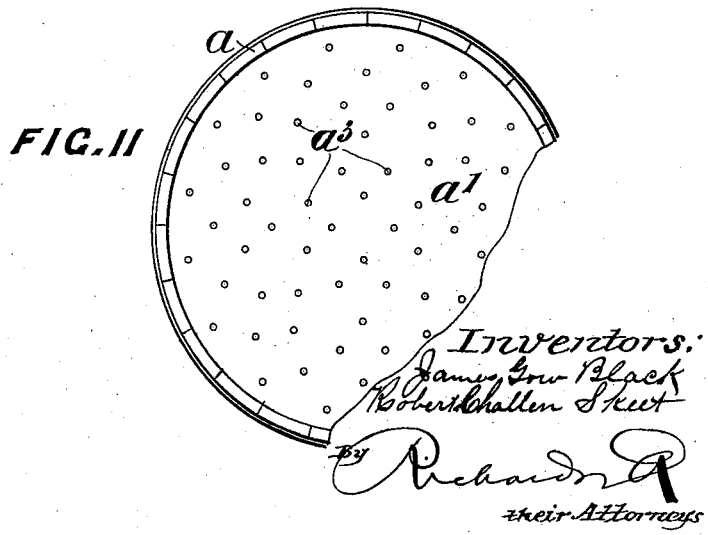
Witnesses:
Inventors:
James Gow Black
Robert Challen Skeet
by Richards
their Attorneys

UNITED STATES PATENT OFFICE.

JAMES GOW BLACK, OF DUNEDIN, AND ROBERT CHALLEN SKEET, OF OAMARU, NEW ZEALAND.

PROCESS OF EXTRACTING GOLD FROM ORES, MINERALS, OR OTHER GOLD-BEARING SUBSTANCES.

SPECIFICATION forming part of Letters Patent No. 620,215, dated February 28, 1899.

Application filed December 16, 1897. Serial No. 662,241. (No specimens.)

*To all whom it may concern:*

Be it known that we, JAMES GOW BLACK, of Dunedin, and ROBERT CHALLEN SKEET, of Oamaru, in the Colony of New Zealand, subjects of the Queen of Great Britain, have invented an Improved Process for Extracting Gold from Ores, Minerals, or other Gold-Bearing Substances; and we do hereby declare that the following is a full, clear, and exact description of the invention, which will enable others skilled in the art to which it appertains to make and use the same.

This invention relates to processes used for obtaining gold from ores, minerals, and other gold-bearing substances; and its object is to obtain the gold in a rapid, efficient, and inexpensive manner.

The invention is carried into effect by treating the ore or other gold-bearing substance after it has been reduced to a powder in any well-known manner with a dilute solution containing about from ten to twenty pounds of strong sulfuric acid, (oil of vitriol,) about from twelve to twenty pounds of chlorid of sodium, (common salt,) and about from five to nine ounces of permanganate of potassium in about one hundred gallons of water.

A solution of from a quarter of the above strength to four times the above strength is serviceable in extracting the gold; but we prefer the strength stated in the last preceding paragraph—namely, ten pounds strong sulfuric acid, twelve pounds chlorid of gold, and five ounces permanganate of potash in about one hundred gallons of water.

Bisulfate of soda may be used instead of sulfuric acid, but in the proportion of about two and a half ($2\frac{1}{2}$) parts, by weight, of the bisulfate instead of one (1) part, by weight, of the acid chlorid of calcium, or chlorid of magnesium or chlorid of potassium or chlorid of ammonium or other suitable chlorids may be used instead of chlorid of sodium in their equivalent proportions.

The manner in which the solvent solution is prepared is as follows: First, mix together fifty gallons of fresh water and from ten to twenty pounds of sulfuric acid, and, second, mix together fifty gallons of fresh water, twelve to twenty pounds of chlorid of sodium, and from five to nine ounces of permanganate of potassium. These two mixtures are mixed together to form a dissolving liquor, which must be used within twenty-four hours to keep its strength. It is advisable to keep the two mixtures apart until they are required for use.

Manganate of potassium or permanganate of sodium or manganate of sodium may be used instead of permanganate of potassium; but if manganates are used about forty per cent. more will be required and about a third more of the sulfuric acid.

Ores or other gold-bearing substances containing pyrites or arsenical pyrites or other sulfids or arsenids or tellurids or selenids or antimonids or organic substances must be thoroughly roasted before treatment with the solution.

In carrying out the invention any suitable apparatus may be used; but we prefer to provide tanks wherein to mix the solution, which tanks are of any convenient shape and of any desired size, according to the quantity of solution to be made. Such a tank is shown in the accompanying drawings, in which—

Figure I is a central vertical section, and Fig. II a plan view, of perforated false bottom.

The leaching-tank $a$ has a false bottom $a'$ and a true bottom $a^2$, with an intervening space $a^4$ between the two bottoms. The false bottom $a'$ is perforated with holes $a^3$ and carries a filter-bed comprised of quartz pebbles $b$, smaller quartz pebbles $b'$ above, and sand $b^2$ at the top. The gold-bearing substance is placed in the tank $a$ upon the filter-bed, and the solvent solution which has mixed in tank $f$ is then allowed to flow through the cock $f'$ onto the gold-bearing substance in tank $a$. The solution percolates through the filter-bed and false bottom into the space $a^4$, whence it may be withdrawn through the stop-cock $c$ and pipe $c'$ into the precipitating-tank $d$. Cocks $d'$ are provided in tank $d$ for the purpose of drawing off the spent solution from the gold sediment which settles on the bottom of said tank $d$. In one tank we mix fresh water and strong sulfuric acid in the proportion previously given of fifty gallons of water to from ten to twenty pounds of acid, the water to be put into the tank before the acid, the mixture to be stirred while the acid is being put in, so as to insure a thorough mixture. In another tank we dissolve and mix permanganate of potassium and chlorid of sodium in fresh water in the proportion previously given of from five to nine ounces of permanganate of potassium and from twelve to twenty pounds of chlorid of sodium in fifty gallons of water. The two mixtures are mixed together in another tank to form the dissolving liquor, which must be employed within twenty-four hours to keep its strength, as previously stated.

The raw or roasted ore or other gold-bearing substance in a finely-powdered condition is put into leaching-tanks having false bottoms fixed at about an inch to two inches above the true bottom and perforated with holes of about half an inch in diameter and six to ten inches apart. On this false bottom is placed a filter-bed of quartz pebbles and sand about six inches deep, larger pebbles resting immediately on the false bottom, with smaller pebbles above, the size gradually diminishing upward, with coarse sand above and finally fine sand at the top.

All the above tanks may be lined with enameled iron, glazed earthenware, or a preparation of paraffin or other material upon which the solvent will not act. The leaching-tanks are filled to within about ten inches of the top with the raw or roasted ore or other gold-bearing substance in a finely-powdered condition, and the solvent solution is then added gradually until it stands at a depth of about six inches above the surface of the ore. A stop-cock communicating with the space between the two bottoms is afterward opened, when the solution which will have filtered or percolated through the filter-bed and false bottom is drawn off into precipitating-tanks, which are preferably made of wood. The tanks may be of any convenient size or shape and lined as previously described. Instead of such filter-bed the false bottom may be covered with any suitable textile material (such as asbestos) as will allow the liquid to pass through freely and will not decolorize the purple-red color of the permanganate solution.

As it is necessary that the dissolving solution should be in contact with every particle of ore, it is necessary or desirable to agitate the mixture in the leaching-tanks to secure such contact. After agitation and standing sometimes from about twelve to seventy-two hours, or longer, if necessary, according to the coarseness of the particles of gold, the solution is drawn off into precipitating-tanks by opening a stop-cock communicating with the space between the two bottoms.

Should the reddish-violet color of the solutions become faint or vanish during leaching, then more of the solution must be added; but so long as the solution retains its reddish-violet color it may be used for dissolving gold.

The methods of precipitating gold are well known, and the sulfurous-acid or the ferrous-sulfate solution is preferred.

By this invention the gold is dissolved rapidly as soon as the solution comes into contact with it, the gold combining the chlorin of the salt, while the sulfuric acid in the presence of the nascent oxygen from the permanganate combines the sodium and the potassium from the common salt and the permanganate, respectively, the reaction thus being a series of double decompositions, which may be termed "concurrent reactions."

We do not claim as part of our invention the use of the permanganates or manganates of potash or of soda in the above solution, but only the use of sulfuric acid and chlorid of sodium in combination with the permanganates or manganates.

What we claim, and desire to secure by Letters Patent, is—

1. A process of extracting gold from ores, minerals or other gold-bearing substances consisting in submitting such ores, minerals or other gold-bearing substances in a powdered condition to the action of solution containing sulfuric acid, chlorid of sodium, and a manganate of an alkali metal and water, in the proportions of one hundred gallons of water, from ten to twenty pounds of sulfuric acid, twelve to twenty pounds of chlorid of sodium, and eight to nine ounces of a manganate of an alkali metal, substantially as set forth.

2. For use in a process of extracting gold from ores, minerals, and other gold-bearing substances, a solvent solution composed of fresh water, and sulfuric acid in the proportion of one hundred gallons of water to from ten to twenty pounds of sulfuric acid, twelve to twenty pounds of chlorid of sodium, and eight to nine ounces of a manganate of an alkali metal, substantially as set forth.

In witness whereof we have hereunto subscribed our names this 30th day of July, 1897.

JAMES GOW BLACK.
ROBERT CHALLEN SKEET.

In presence of—
T. G. DALZILL,
A. J. PARK.